United States Patent [19]

Schindler et al.

[11] 4,228,730
[45] Oct. 21, 1980

[54] AUTOMATIC FRENCH FRYER

[75] Inventors: James C. Schindler, Naperville; Steve Kroll, Schaumburg, both of Ill.

[73] Assignee: Restaurant Technology, Inc., Oak Brook, Ill.

[21] Appl. No.: 25,379

[22] Filed: Mar. 30, 1979

[51] Int. Cl.³ .............................................. A47J 37/12
[52] U.S. Cl. ................................. 99/329 R; 99/331; 99/334; 99/338; 99/341; 99/342; 99/352; 99/355; 99/404; 99/407; 126/391
[58] Field of Search ................ 99/404, 451, 341, 342, 99/352, 334, 326, 329 R, 331, 427, 443 C, 338; 426/509, 523; 126/391, 369.1; 222/415

[56] References Cited

U.S. PATENT DOCUMENTS

| | | | |
|---|---|---|---|
| 2,546,163 | 3/1951 | McBeth | 99/404 |
| 2,853,937 | 9/1958 | Peck | 99/404 |
| 3,487,770 | 1/1970 | Svensson | 99/334 |
| 3,585,923 | 6/1971 | Waller | 99/404 |

FOREIGN PATENT DOCUMENTS

| | | | |
|---|---|---|---|
| 998725 | 1/1952 | France | 99/404 |
| 1306757 | 9/1962 | France | 99/407 |
| 214235 | 10/1968 | U.S.S.R. | 222/415 |

Primary Examiner—Billy J. Wilhite
Attorney, Agent, or Firm—Dressler, Goldsmith, Shore, Sutker & Milnamow, Ltd.

[57] ABSTRACT

An apparatus is provided for cooking frozen french fries in which a supply of frozen potato pieces is held in a hopper and in which the potato pieces are continuously fed from the hopper at a predetermined, adjustable rate, by means of an upwardly slanting endless conveyor, into an enclosed bath of hot cooking liquid. Water vapor generated when the frozen potato pieces contact the hot liquid is removed by a vapor extraction system. A second endless conveyor is provided within the cooking liquid to carry the potato pieces submerged within the liquid while being cooked. The speed of the potato pieces through the cooking liquid is continuously adjusted, in response to cooking liquid temperature fluctuations, as necessary to provide french fries consistently cooked to the same degree. The french fries are automatically discharged from the apparatus.

34 Claims, 5 Drawing Figures

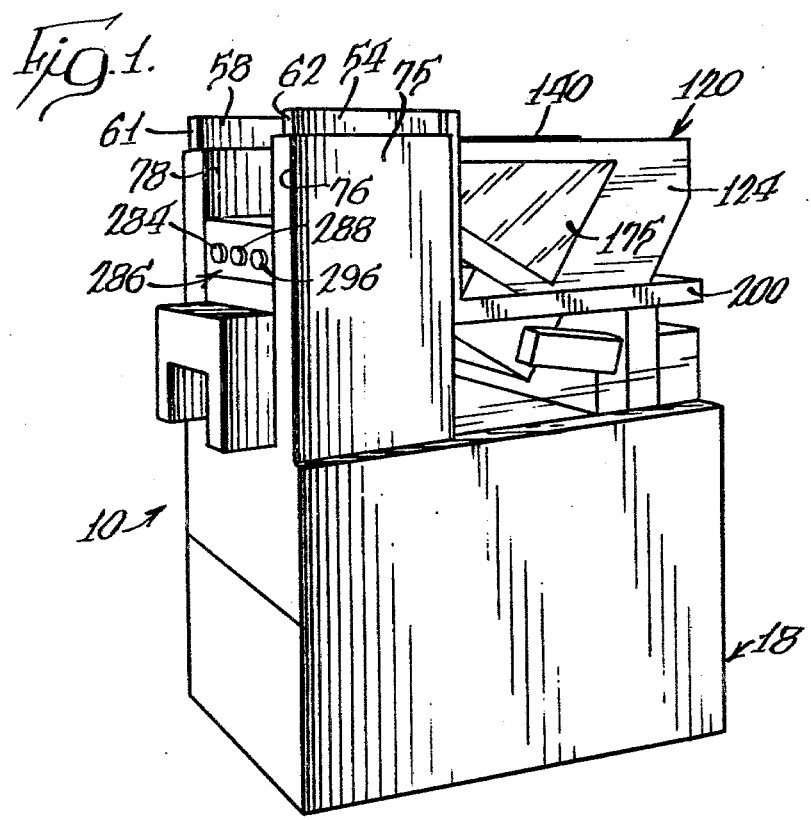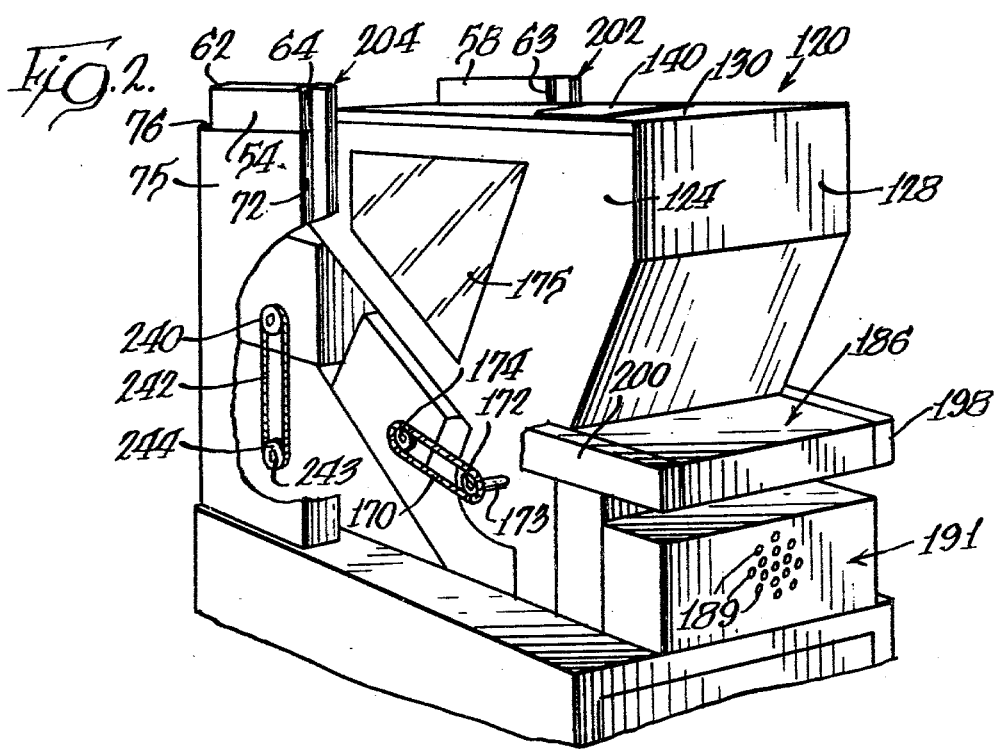

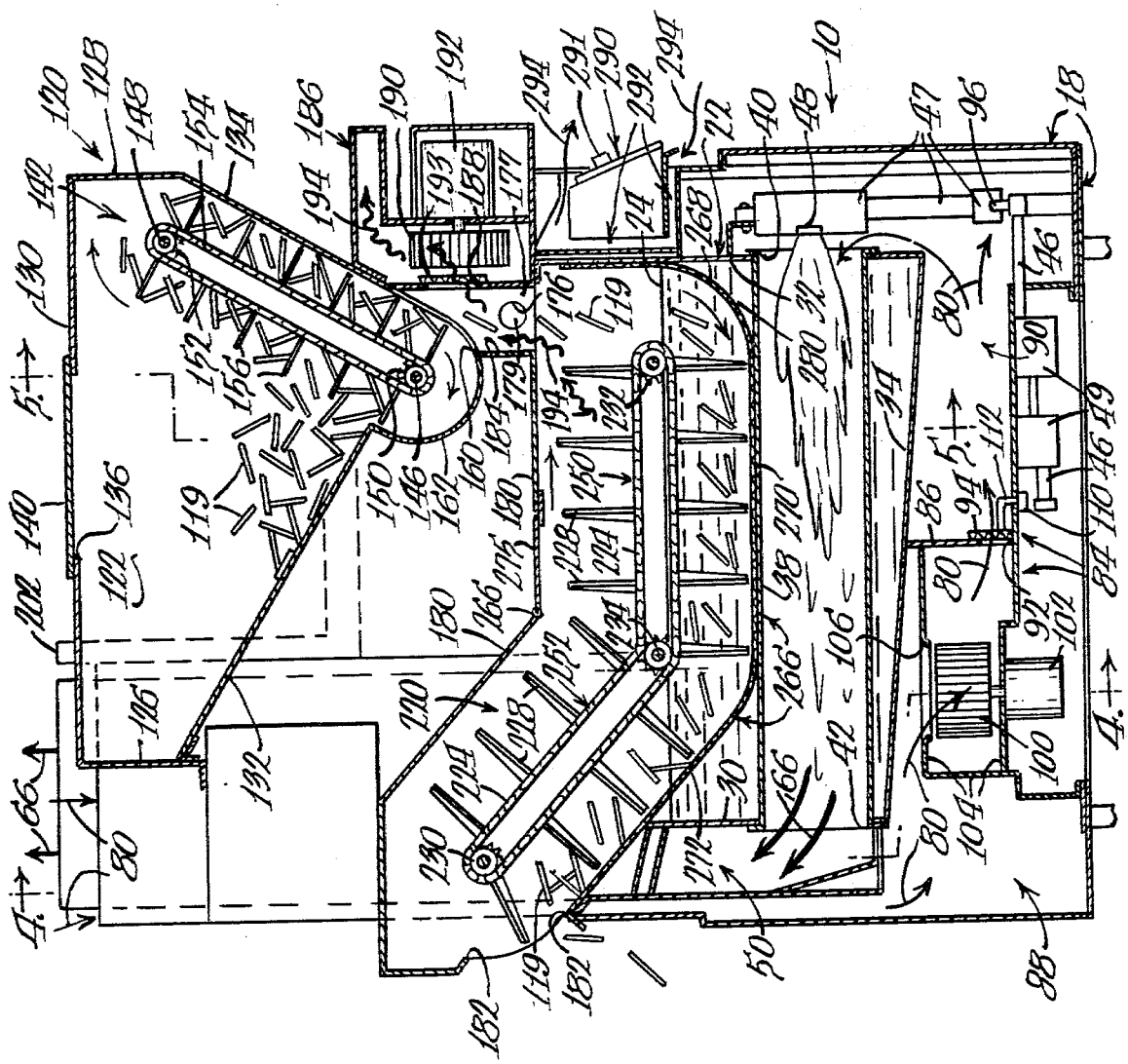

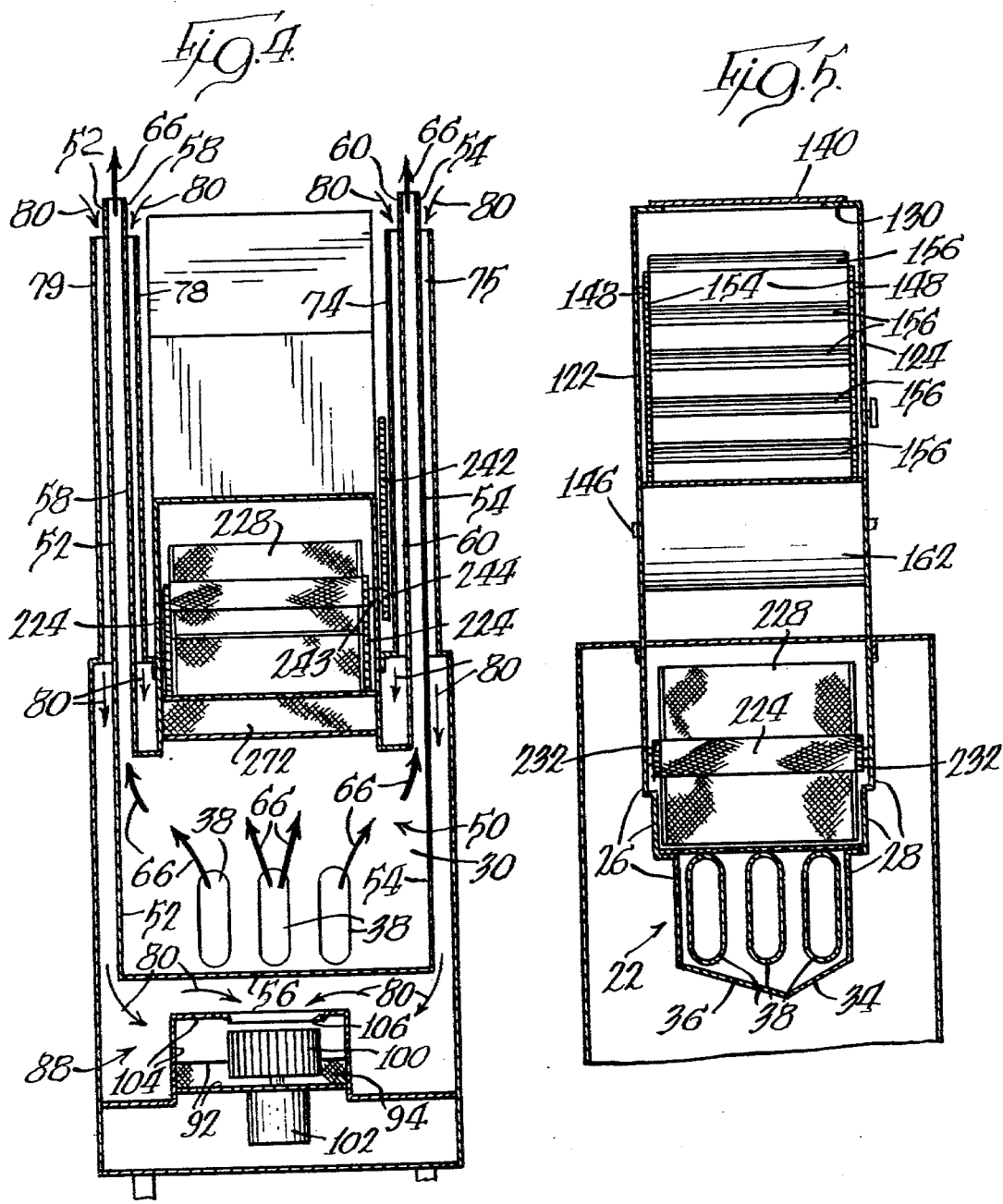

4,228,730

AUTOMATIC FRENCH FRYER

BACKGROUND OF THE INVENTION

The present invention relates to automatic food cookers and particularly to the fryer type in which the operations of feeding, frying, and discharging the food are automatically controlled.

More specifically, the present invention includes an apparatus which is especially adapted for cooking frozen food which, in the uncooked condition, is susceptible to damage from handling, such as frozen potato pieces which are typically known as french fries.

The apparatus of the present invention is particularly suitable for use in institutions and restaurants wherein a relatively high volume of cooked food product is desired and wherein a minimum amount of operator labor and attention is required.

In many institutions and restaurants, it is desirable that food be processed quickly, efficiently, and under sanitary conditions with a minimum amount of operator labor and attention. Further, within these constraints, it is desirable to provide a consistently uniform cooked food product.

Many types of food can be most efficiently handled by restaurants if the food is received at the restaurant in a frozen condition so that it can be readily stored, without spoilage, until cooking. Thus, it would be desirable to provide an automatic device for cooking frozen food and which would allow relatively large amounts of frozen food to be initially loaded into the device so that frequency of reloading by the operator would be greatly reduced.

With some frozen foods, and especially with french fries, automatic handling and cooking processes must overcome a number of problems. For example, a typical frozen french fry may have a generally square-shaped cross section of about ¼ inch on a side and a length of between two and six inches. When such french fries are mechanically processed during cooking they may tend to break, owing to the force of mechanical members moving against the french fries.

Further, when frozen french fries are loaded into a large pile, from which pile they are to be continuously removed for further processing, removal of the fries from the pile can cause the french fries to break, owing to the weight of the pile of french fries acting to prevent the french fries within the pile from being easily withdrawn.

Thus, in providing a device for automatically cooking french fries, it would be desirable to provide mechanisms which would gently handle the frozen french fries to minimize the breakage and other damage to the fries.

Frozen french fries typically have a relatively high surface water content which is given up during cooking. In automatically cooking french fries, it would be desirable to remove the steam generated when the frozen french fries first contact the hot cooking liquid in order to prevent subsequent condensation of the steam in and around the cooking apparatus and to maintain an acceptable ambient atmosphere for operators and other personnel in the area of the cooking apparatus.

In restaurants, it would also be desirable to provide the capability for automatically cooking french fries at a varying production rate. Further, in order to ensure a uniform quality product, it would be desirable to provide means for cooking the french fries to the same degree or extent even though the cooking liquid temperature may fluctuate.

With such an automatic apparatus, it would be additionally advantageous to provide an enclosing means for reducing spattering or spilling of the cooking liquid and for reducing any fire hazards.

Further, it would be advantageous to provide for the operation of the apparatus in a manner that would extend the usable life of the cooking liquid by reducing the amount of broken food particles or foreign matter that can fall into and/or remain in the cooking liquid.

In a cooking apparatus using gas combustion for heating, it would also be beneficial to provide an energy efficient system in which discharging combustion exhaust gases are used to heat incoming air to thereby decrease the heat input required of the gas.

SUMMARY OF THE INVENTION

The present invention provides an apparatus especially adapted for cooking frozen french fries wherein a relatively large supply of french fries can be initially loaded into the apparatus of the invention; wherein the frozen french fries are continuously, but delicately, fed at a predetermined, adjustable rate into a bath of hot cooking liquid; wherein the majority of the french fries are dropped directly into the cooking liquid without impinging upon structures which might otherwise damage the french fries; wherein water vapor given off by the frozen fries contacting the hot liquid is extracted and removed from the apparatus; wherein the french fries are carried through the cooking liquid in a generally uniform distribution within the liquid; wherein the residence time of the french fries within the cooking liquid can be reduced or increased, in response to cooking liquid temperature fluctuations, as may be necessary to provide cooked french fries which have all been cooked to the same extent; and wherein the cooked french fries are automatically discharged from the apparatus.

The apparatus of the present invention has an elongate reservoir mounted on a frame for holding a predetermined amount of cooking liquid. The reservoir is entirely enclosed except for a few necessary openings—one being a frozen french fry inlet passageway above the cooking liquid at one end of the reservoir and one being a discharge aperture above the cooking liquid at the other end. Circulation of outside air over the surface of the cooking liquid within the reservoir is thus substantially reduced. Further, the possibility of foreign matter falling into the cooking liquid from the external environment is almost totally eliminated. Since the reservoir is enclosed, there is less spillage and/or spattering of hot cooking liquid. The possibility of operating personnel being accidentally burned by cooking liquid or slipping on spilled cooking liquid is greatly reduced. The enclosed construction of the apparatus also reduces the possibility of the cooking liquid being ignited or, if ignited, of continuing to burn.

The cooking liquid is heated by means of generally horizontally disposed combustion gas burner tubes mounted within the reservoir and extending from one end of the reservoir to the other end below the surface of the cooking liquid. The burner tubes define inlet openings at one end exterior of the reservoir and outlet openings at the other end exterior of the reservoir. The reservoir is sealed around the burner tubes inwardly of the inlet and outlet openings. Combustion gas is supplied, through conventional conduits and valves, to the burner tube inlet openings.

Intake air inlet ducts are provided between the burner tube inlet openings and the ambient atmosphere exterior of the apparatus. A flue exhaust duct system communicating between the burner tube outlet openings and the ambient atmosphere exterior of the apparatus is also provided. The flue exhaust ducts and the air inlet ducts are arranged in thermally conductive contact for effecting the exchange of heat from the hot exhaust gases to the incoming cooler inlet air.

A hopper is mounted on the frame of the apparatus above the cooking liquid reservoir and is adapted to hold a supply of pieces of frozen potato. The hopper has a pair of generally vertical opposed sidewalls and first and second sloping bottom walls which converge towards the bottom of the hopper. Near the bottom of the hopper, in in the second sloping bottom wall, there is an aperture located above the cooking liquid at one end of the reservoir through which the french fries are fed.

An endless conveyor is mounted in the hopper on horizontal axes which are generally perpendicular to the sidewalls of the hopper. This hopper conveyor is arranged generally parallel to the second sloping bottom wall to define an upwardly sloping forward conveying path facing away from, and parallel to, the second sloping bottom wall and a return conveying path facing towards, and parallel to, the second sloping bottom wall. Transverse paddles are provided on the hopper conveyor and closely fit with the second sloping bottom wall in the return conveying path. The hopper conveyor can thus carry frozen potato pieces from the bottom of the hopper upwardly in the forward conveying path and then downwardly along the second sloping bottom wall in the return conveying path to the discharge aperture from which the frozen potatoes are dropped into the cooking liquid below.

A water vapor extraction duct is provided above the reservoir and below the hopper discharge aperture in the region where the frozen potato pieces fall into the cooking liquid. A blower is mounted within the water vapor extraction duct for reducing the pressure therein and for thus effecting a positive withdrawal of the water vapor from the reservoir of cooking liquid. The water vapor extraction duct is connected to the flue exhaust ducts of the apparatus so that the water vapor is expelled along with the flue gases (gases of combustion) to a suitable discharge point for further processing and/or discharge to atmosphere at a location presenting no danger or discomfort to operating personnel.

A conveyor is provided within the cooking liquid reservoir for moving the french fries during cooking. This reservoir conveyor includes an endless belt mounted on horizontal transverse axes with one of the axes defining a loading end of the conveyor at a location in the reservoir to provide a generally unobstructed free fall area below the hopper discharge aperture. The reservoir conveyor belt is generally flexible and has transverse foraminous paddles (such as perforated plates) extending outwardly from the flexible belt defining a forward conveying path below the belt and a return path above the belt.

The conveyor has longitudinally aligned first and second portions with the first portion arranged with the flexible belt disposed generally horizontally and submerged within the cooking liquid in the forward conveying path and above the cooking liquid in the return path. The second portion of the reservoir conveyor is angled upwardly with respect to the first portion and extends out of the cooking liquid to the reservoir discharge aperture.

Within the reservoir, and below the conveyor, a foraminous screen or perforated plate is provided above the burner tubes. The foraminous screen has a contour generally parallel to the first and second portions of the reservoir conveyor and thus slopes upwardly at one end along with, but below, the second portion of the reservoir container.

The paddles on the reservoir conveyor closely fit with the sidewalls of the reservoir and with the foraminous screen below the conveyor whereby generally equal amounts of potato pieces between pairs of adjacent paddles are carried by the paddles through the cooking liquid and are discharged from the apparatus out of the reservoir discharge aperture after the pieces have been cooked.

It is thus seen that the novel apparatus of the present invention has a number of distinct advantages. First, it efficiently processes frozen french fries on a continuous, automatic basis and with mechanisms uniquely designed to reduce the physical damage to the frozen french fries during the handling process. Further, the apparatus of the present invention is seen to provide an energy efficient system wherein incoming cooler air is heated by the discharging hotter exhaust gases. Additionally, the environment around the apparatus can be kept free of steam generated by the cooking of the frozen french fries through the use of a water vapor extraction system which discharges to the flue exhaust duct.

Use of foraminous paddles in the reservoir conveyor serve to sweep food particles out of the cooking liquid and this action keeps the cooking liquid relatively free of floating and submerged food particles or foreign matter. This extends the life of the cooking liquid.

To provide a product of consistently uniform quality, the apparatus of the present invention is controlled to vary the length of time during which the french fries are held in the cooking liquid. This means that variations in cooking liquid temperature can be accommodated without a change in product quality.

The entirely automatic process, which is adapted to provide a relatively high rate of product throughput, is thus seen to reduce operator labor and attention, as well as eliminate operator error and inconsistencies in the cooked product.

With conventional, non-conveyor french fry machines, steel baskets are typically first loaded with potato pieces at a location exterior of the cooking liquid reservoir when the baskets are "cold" (at room temperature). The baskets are then submerged within the hot cooking liquid. This can cause a significant drop in the cooking liquid temperature and therefore cause wide temperature variations during the cooking cycle. Such cooking temperature variations must be accommodated by whatever heating means is employed and there is a danger of overheating the cooking liquid in such circumstances. Overheating may have damaging effects upon the cooking liquid.

In the novel apparatus of the present invention, the reservoir conveyor belt and foraminous paddles carried thereon are moved completely submerged through the hot cooking liquid for a substantial portion of the endless conveying loop. These conveyor components can thus absorb a substantial amount of heat during submergence. The conveyor belt and paddles are lifted out of the hot liquid for only a relatively short period of time.

Thus, the conveyor components do not cool down significantly during this period. Therefore, once the conveyor components have been initially heated up (within a short time after initially heating up the cooking liquid), the conveyor components remain within an elevated temperature range and do not cause any significant temperature drop in the hot cooking liquid as they are moved into and out of the cooking liquid.

The novel combination of elements in accordance with the present invention is seen to yield desirable and beneficial results—results which are also a substantial improvement over the prior art.

Numerous other advantages and features of the present invention will become readily apparent from the following detailed description of the invention and of one embodiment thereof, from the claims and from the accompanying drawings.

BRIEF DESCRIPTION OF THE DRAWINGS

In the accompanying drawings forming part of the specification, and in which like numerals are employed to designate like parts throughout the same, FIG. 1 is a perspective view of the apparatus of the present invention viewed from the discharge end;

FIG. 2 is a fragmentary perspective view of the apparatus of the present invention viewed from the loading end of the apparatus;

FIG. 3 is a cross-sectional side view of the apparatus;

FIG. 4 is a cross-sectional view taken generally along the plane 4—4 in FIG. 3; and FIG. 5 is a cross-sectional view taken generally along the plane 5—5 in FIG. 3.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The precise shapes and sizes of the components herein described are not essential to the invention unless otherwise indicated, since the invention is described with reference to an embodiment which is simple and straightforward.

For ease of description, the apparatus of this invention will be described in a normal operating position, and terms such as upper, lower, horizontal, etc. will be used with reference to this normal operating position. It will be understood, however, that the apparatus of this invention may be manufactured, stored, transported and sold in an orientation other than the normal operating position described.

The apparatus of this invention has certain conventional drive mechanisms and control mechanisms the details of which, though not fully illustrated or described, will be apparent to those having skill in the art and an understanding of the necessary functions of such mechanisms.

The automatic cooking apparatus of the present invention is designated generally as 10 in FIG. 1. The apparatus 10 is specifically adapted for feeding frozen french fries from a bulk supply to a hot cooking liquid, cooking the fries in the liquid, and discharging the fries. As the french fries are cooked, they are automatically and continuously discharged from the cooking apparatus 10 into a receiver (not illustrated) where an operator can, if desired, put the cooked french fries into containers. Any suitable receiving means may be used with the cooking apparatus 10 of the present invention.

It is to be realized that the apparatus of the present invention is not limited to use with french fries but may be used with other comestibles.

COOKING LIQUID RESERVOIR

With reference to FIG. 1, and more particularly, with reference to the cross-sectional view of FIG. 3, it can be seen that a generally enclosed frame 18 supports and contains the principle subassemblies of the apparatus in an arrangement generally sealed from the ambient atmosphere except, of course, at certain necessary inlet and outlet apertures and access areas.

A reservoir 22 is mounted within the frame 18 for holding a predetermined amount of cooking liquid 24. As illustrated in FIGS. 3 and 5, the reservoir has a generally elongate configuration with opposed sidewalls 26 and 28, end walls 30 and 32, and a pair of converging bottom walls 34 and 36 which are connected along a joint sloping generally downwardly away from the discharge end of the apparatus 10.

HEATING SYSTEM

A means for heating the cooking liquid 24 in the reservoir 22 is provided within the cooking apparatus 10. Specifically, a gas combustion system is especially adapted with a number of novel features to increase the cooking efficiency and improve ambient operating conditions. Three parallel combustion gas burner tubes 38 are provided within the reservoir 22 extending from one end to the other.

With reference to FIG. 3, each burner tube 38 is seen to have an inlet opening 40 and an outlet opening 42, both of which openings communicate with the exterior of the reservoir 22. The reservoir 22 is sealed around the burner tubes 38 inwardly of each inlet and outlet opening to retain the cooking liquid 24 within the reservoir 22. The elongate burner tubes 38 provide a containment structure for the combustion flames and the combustion supporting air within the reservoir 22 below the surface of the cooking liquid 24 so that the cooking liquid can be heated through contact with the hot burner tubes 38.

The combustion is effected with apparatus comprising a combustible gas supply and ignition system which includes a gas supply conduit or pipe 46, a burner 47 which has discharge ports 48 and which is connected to pipe 46, and an ignition apparatus, such as an electronically actuated spark ignition mechanism (not illustrated). Alternatively, a conventional, continuous pilot flame ignition system could be used.

A conventional, electrically operated, two-stage valve 49 is provided in the gas supply pipe 46 to open or close in response to the control system (explained hereinafter in more detail) so as to provide gas when needed on an intermittent basis to maintain the temperature of the cooking liquid 24 at a certain value or within a selected range. Typically, the valve 49 is of the well-known, two-stage type which provides an initial, low gas flow for ignition and subsequently provides an increased gas flow after ignition to support the continued combustion.

The burner tubes 38 are connected at the outlet ends 42 to an exhaust or flue duct system 50, as best illustrated in FIG. 4, having vertical sidewalls 52 and 54 and a bottom wall 56. A vertical sidewall 60 is located on the same side of the apparatus 10 as the vertical sidewall 54 and is spaced from, but parallel to, the sidewall 54. As best illustrated in FIGS. 1 and 2, the vertical sidewalls 54 and 60 are connected on each end by vertical cross walls 62 and 64 so as to define an upstanding exhaust duct or flue having a generally rectangular cross section through which the exhaust gases, designated by the arrows 66, are discharged to atmosphere above the apparatus 10 or to a further processing system or stack (not shown). Similarly, on the other side of the apparatus 10, a vertical sidewall 58 is spaced inwardly of, and parallel to, vertical sidewall 52. These two sidewalls are also joined by vertical cross walls 61 and 63 (visible in FIG. 1) to form an upstanding exhaust duct or flue.

Inlet air for supporting the combustion is brought to the burner tube inlet openings 40 through an intake duct system alongside the above-described exhaust duct system as best illustrated in FIGS. 2 and 4. Specifically, on one side of the apparatus 10, spaced-apart, parallel walls 74 and 75 are joined on each end by cross walls 76 and 77 to form a duct of generally rectangular cross section which surrounds the rectangular exhaust duct. Similarly, on the other side of the apparatus 10, spaced-apart, parallel sidewalls 78 and 79 are joined by cross walls (not visible in the figures) to form a generally rectangular inlet duct.

Inlet air, designated by arrows 80, passes through the intake ducts to a sealed inlet plenum 84 (FIG. 3) below, and partially surrounding reservoir 22. A partition wall 86 divides the plenum 84 into a first chamber 88 and a second chamber 90. The first and second chambers 88 and 90 communicate through an aperture 92 in the partition wall 86. A restriction 94 is placed in or over the aperture 92 to maintain a desired static back pressure in the second chamber 90. The restriction 94 may be a perforated plate in which the size of the perforations can be adjusted.

The first chamber 88 is in direct communication with the inlet duct system at one end so that inlet air may enter the second chamber 90 through the aperture 92. Some of the inlet air 80, after entering the second chamber 90, flows into the burner tubes 38 through the inlet openings 40 for more efficiently supporting the gas combustion within the tubes. Additionally, a portion of the inlet air 80 may flow into the burner 47 through an orifice 96 in burner 47 for mixing with the gas prior to discharge from ports 48 into tubes 38 where combustion occurs.

Increased efficiency can be obtained by providing a blower 100 within enclosure 104 in the first chamber 88 and driven by motor 102. The enclosure 104 has an inlet aperture 106 through which incoming air 80 is drawn by blower 100 and then directed through the partition wall aperture 92 for pressurizing the second chamber 90 and supporting combustion.

To insure that the apparatus is operated properly, and more specifically, to insure that the apparatus does not operate without adequate pressurized combustion air, a pressure switch 110 is mounted to the bottom of plenum 84 and is adapted to communicate with the pressurized atmosphere within the plenum 84 through an open ended sensing tube 112 which is oriented to sense the air pressure of the air being discharged from the blower 100.

The pressure switch 110 is set at a minimum setting, such as 0.5 psig. When the pressure falls below that setting (e.g., if the blower 100 were to fail or if the aperture 92 were to become blocked for some reason), the pressure switch 110, through a suitable electrical interlock, shuts down the entire fryer apparatus by closing valve 49 in the gas supply pipe 46 and by switching off the motors that drive the mechanisms for moving the french fries through the fryer as will be explained in more detail hereinafter.

With the novel air intake and exhaust duct system of the present invention, it is seen that the hot exhaust gases discharging from the burner tubes 38 pass up the central portions of the surrounding air inlet ducts. Thus, the flue exhaust ducts and the inlet ducts are in intimate, thermally conductive contact so that a portion of the heat from the hot exhaust gases can be transferred to the cooler incoming inlet air.

In the embodiment illustrated, the inlet air is preheated, at steady state, to about 250° F. for supporting combustion. When the apparatus is initially started, the flue gas temperature may rise to about 530° F. This is an initial transient response and the flue gas temperature subsequently drops to about 380° F. at steady state when the cooking liquid 24 is maintained at between 320° F. to 340° F. In contrast, the temperature of exhaust gases from typical prior art deep fat fryers is usually between 900° F. and 1200° F.

The above-described gas combustion system may have additional elements known to those skilled in the art. Each burner tube 38 preferably has an internal radiant structure for effecting a desired air flow distribution or turbulence within the tube and thereby increasing the transfer of heat from the hot gases within the burner tube to the walls of the burner tube which are in contact with the cooking liquid. Such radiant structures may be especially adapted for the particular size and configuration of the burner tubes or may be of conventional designs.

HOPPER AND METERING CONVEYOR

The frozen pieces of food, such as frozen pieces of potato for french fries 119, are initially loaded into a hopper 120, as best illustrated in FIG. 1, which is disposed above, and spaced from, the cooking liquid 24 in the reservoir. As best illustrated in FIGS. 3 and 5, the hopper has a pair of opposed sidewalls 122 and 124, a pair of opposed upper end walls 126 and 128, an upper wall or top 130, a first sloping bottom wall 132 and a second sloping bottom wall 134. The upper wall or top 130 defines an aperture 136 through which the pieces of food or frozen potato 119 are initially loaded and which may be covered over by a slidable, or otherwise removable, cover plate 140.

A first conveyor means or endless conveyor device 142 is mounted in the hopper 120 about horizontal axes 146 and 148 which are generally perpendicular to the sidewalls 122 and 124. The conveyor device 142 has, at its lower end sprockets 150 and, at its upper end, sprockets 152. The conveyor 142 further has a pair of spaced-apart, parallel endless link chains, which, as illustrated for one chain 154, are trained around the sprockets 150 and 152 and carry outwardly projecting partitions or conveyor flights 156. Instead of having a conventional, moving flexible belt carried by the drive chains 154, the conveyor 142 can be provided with a stationary support surface between the pair of drive chains in the form of a continuous loop around the two axes 146 and 148 and inwardly of the bottom edges of the flights 156. In any case, the conveyor device 142 defines a generally upwardly sloping forward conveying path facing away from, and parallel to, the second sloping bottom wall 134 and a return conveying path facing towards, and parallel to, the second sloping bottom wall 134.

Near the bottom of the hopper 120, the second sloping bottom wall 134 defines a hopper discharge aperture 160 spaced above the level of the cooking liquid 24 in the reservoir 22 through which the potato pieces 119 are passed. At the bottom of the hopper 120, the first and second sloping bottom walls 132 and 134 form a semi-cylindrical wall 162 having a radius generally equal to the perpendicular distance between the second sloping bottom wall 134 and the conveyor chains 154. The flights 156 are generally closely fitting in the return conveying path against the second sloping bottom wall 134, as well as at the bottom of the conveyor, adjacent the semi-cylindrical surface 162.

The hopper conveyor 142 is preferably driven, as illustrated in FIG. 2, through sprockets 150 by a belt or driven chain 170 in engagement with a sprocket 172 secured through shaft 173 at the bottom end of the conveyor to the sprockets 150. The driven chain 170 is driven via sprocket 174 connected to a suitable motor (not illustrated). The motor may be controlled, by suitable control means, to vary the speed of the conveyor flights 156, and hence, to vary the conveying rate of the pieces of frozen potato.

To allow observation of the supply of frozen potato pieces in the hopper 120, a glass or plastic window 175 is provided in either or both sides of the hopper as illustrated in FIGS. 1 and 2. Further, as illustrated in FIG. 3, a circular observation port 176 is provided below the discharge aperture 160 in the lower extension 177 of the hopper sidewall 122. The port 176 is covered with a movable closure member 170 which can be moved away from the port to allow visual inspection of the cooking liquid level and of the potato pieces falling through the discharge aperture 160.

In operation, the hopper conveyor 142 moves the flights in a generally clockwise direction as viewed in FIG. 3 and picks up frozen pieces of potato 119 from along one side of the pile of potato pieces within the hopper and especially from the very bottom of the pile within the hopper. The flights 156 of the conveyor device 142 are preferably spaced about two inches apart when used with french fries having a length of between two and six inches and having a generally square cross-sectional configuration with ¼-inch long sides. The flights 156 pick up approximately equal amounts of frozen potato pieces 119 and carry the potato pieces around the top of the conveyor upper axis 148 and down alongside the second sloping wall 134 to the hopper discharge aperture 160 where the potato pieces drop into the cooking liquid 24 in the reservoir 22 below. Preferably, the hopper conveyor 142 and discharge aperture 160 are arranged, relative to the level of the cooking liquid, so that the potato pieces drop into the liquid through a free fall distance of about six inches.

Frozen french fries have characteristics which make proper mechanical handling difficult. The above-described hopper and conveyor subassembly overcome these difficulties. First, the frozen potato pieces have a high surface water content, and may stick together. Secondly, the frozen pieces of potato, with their elongate shape and relatively small cross section, are structurally weak and are easily broken or damaged. Consequently, the conveying of the french fries from a large pile within the hopper 120 must be effected in a way that will minimize breakage and yet convey the french fries into the cooking liquid at a generally uniform rate.

It has been found that if the angle of the first sloping bottom wall 132 with respect to the horizontal is too small, the frozen pieces of potato do not properly slide down to the bottom of the hopper and thus, sporadic or erratic feeding of the potato pieces will occur.

It has also been found that with frozen potato pieces having a length of between two and six inches and having a generally square cross section with ¼-inch sides, best results are obtained when the conveyor device 142 is parallel to the second sloping bottom wall 134 as illustrated in FIG. 3 and when the angle of the second sloping bottom wall 134 is between 40° and 70° with respect to the horizontal, and preferably, about 60°. Similarly, best results are obtained when the first sloping bottom wall 132 forms an angle with respect to the horizontal of between 20° and 50°, and preferably about 30°. At these angles, the french fries at the bottom of the pile in the hopper 120 are not under so much vertical weight force from the overlying french fries so as to cause them to break when they are conveyed upwardly.

With the novel hopper structure of the present invention, numerous advantages are realized. Specifically, the lifting of the frozen potato pieces from the bulk supply of potato pieces within the hopper results in less breakage of the potato pieces compared to other systems wherein the entire supply of frozen potato pieces is pushed forwardly or wherein a leading portion of the pile of potato pieces is scraped away and into a discharge chute.

Also, the hopper configuration allows the loading aperture 136 to be located at a position laterally displaced from the conveyor device 142 so that the frozen potatoes do not drop directly on the moving flights 156 during loading of the hopper.

Further, because the lower flights of the hopper conveyor are preferentially loaded relative to the upper flights, the novel hopper design provides for a "first in, first out" processing of the frozen potato pieces. That is, the frozen potato pieces that are first loaded into the hopper tend to move toward the bottom of the hopper as the conveyor is operated and, when subsequent loads of potato pieces are put into the hopper, the "old" potato pieces already in the hopper, at the bottom, will be removed by the conveyor device 142 before most of the newly added potato pieces are removed.

When frozen pieces of potato are dropped into a hot cooking liquid, heat is absorbed by the frozen pieces of potato and the temperature of the cooking liquid, in the local region around the potato pieces, tends to drop. If many pieces of frozen potato are dropped in a relatively large clump into the cooking liquid, two things tend to happen. First, the cooking liquid around the clump of french fries cools considerably, and secondly, the potato pieces in the center of the clump are not immediately contacted by the hot cooking liquid. The cooking of the center pieces thus cannot begin until the clump has come apart and dispersed somewhat in the cooking liquid. To overcome these difficulties, it is desirable to drop the frozen french fries into the cooking liquid at a relatively uniform rate but with a relatively small number of pieces dropping into the liquid at any one time. Ideally, it would be desirable to bring the entire surface of an individual piece of potato into intimate contact with the cooking liquid as rapidly as possible and without causing the temperature of the cooking liquid to drop significantly.

With the apparatus of the present invention, it is possible to feed frozen pieces of potato into the cooking liquid at a relatively high rate on a continuous basis in a manner which avoids the intermittent feeding of relatively large clumps of frozen potato pieces into the hot cooking liquid.

WATER VAPOR EXTRACTION SYSTEM

It can be seen in FIG. 3 that the reservoir 22 has an upper enclosure wall 180 which covers over the reservoir except at the discharge end where a discharge aperture 182 is defined and at the loading end where an inlet passageway 184 is defined. The hopper discharge aperture 160 is aligned with and communicates with the inlet passageway 184. On one side of the inlet passageway 184 is a water vapor extraction duct 186 which communicates through aperture 188 with the inlet passageway 184.

Water vapor, formed from the frozen potato pieces contacting the hot cooking liquid, is drawn off through aperture 188 into the vapor extraction duct 186. Preferably, a blower 190, driven by motor 192, is provided within the water vapor extraction duct 186 for effecting a positive removal of the water vapor generated within the reservoir 22. The blower motor 192 is surrounded by an enclosure 191 having apertures 189 to permit the circulation of air around the motor 192.

A perforated screen 193 is disposed across the aperture 188 in front of the blower 190 to prevent potato pieces or other foreign matter from entering the water vapor extraction duct system. The water vapor, indicated by arrows 194, as illustrated in FIGS. 1, 2, and 3, passes from either side of the duct 186 through horizontal ducts 198 and 200 to vertical ducts 202 and 204, respectively. The vertical ducts 202 and 204 may be connected to the combustion gas exhaust ducts if desired, or to other exhaust gas receivers.

RESERVOIR CONVEYOR

A second conveyor 220 is provided in the reservoir 22 for transporting the potato pieces 119 through the hot cooking liquid 24. The second conveyor 220 comprises an endless flexible belt 224 and outwardly projecting foraminous flights, partitions, or paddles 228. The flexible belt 224 is preferably made from a chain link mesh material and is adapted to engage pairs of sprockets 230 oriented on a horizontal axis at the discharge end, a pair of sprockets 232 oriented on a horizontal axis at the loading end of the conveyor, and an intermediate pair of sprockets 234. Preferably, as illustrated in FIGS. 2 and 3, the belt 224 and flights 228 are driven by the pairs of sprockets 230 which are in turn rotated by a motor (not shown) acting through drive sprocket 240, drive belt 242 and driven sprocket 244 which is connected to the pair of sprockets 230 by shaft 243.

In operation, the conveyor belt 224 and foraminous paddles 228 are moved in a generally clockwise orientation as viewed in FIG. 3 so as to define a forward conveying path below the belt 224 and a return path above the belt 224.

As best illustrated in FIG. 3, the reservoir conveyor 220 defines two longitudinally aligned portions, a first portion 250 beneath the hopper 120 and an upwardly slanting second portion 252. The first portion is arranged with the flexible belt 224 disposed generally horizontally and submerged within the cooking liquid 24 in the forward conveying path and above the cooking liquid 24 in the return path. The second portion 252 is angled upwardly with respect to the first portion 250 and extends out of the cooking liquid 24 to the reservoir discharge aperture 182. Preferably, with respect to the conveyor forward path, the level of the cooking liquid 24 is at the level of the belt on the bottom of the conveyor first portion 250 or about one inch above the belt.

A foraminous screen or perforated metal sheet 266 is provided in the reservoir 22 below the conveyor 220 and is adapted to follow the locus of the distal edges of the conveyor paddles 228 as they travel in the conveying path. In particular, the foraminous screen 266 has 1) a first arcuate portion 268 at the loading end of the conveyor beneath the hopper discharge aperture 160, 2) a second straight, generally horizontal portion 270 merging with the arcuate portion 268, and 3) a third upwardly sloping portion 272 merging from the straight portion 270 and extending to the reservoir discharge aperture 182. The foraminous paddles 228 in the forward conveying path are closely fitting with the sides of the reservoir and with the foraminous screen 266 below the conveyor so that the potato pieces are carried along by the paddles which define between them compartments for the potato pieces. Preferably, the foraminous screen has apertures through about 63 percent of its surface area, preferably in the form of 5/32-inch diameter holes spaced on 3/16-inch centers.

To permit fresh cooking liquid 24 to be easily added to the reservoir 22, the top enclosure wall 180 has a door 275 mounted about shaft 276. The door 275 can thus be opened upwardly to give access to the reservoir 22.

As illustrated in FIG. 3, a suitable temperature sensor, such as thermocouple 280, is secured to the bottom side of the arcuate portion 268 of the foraminous screen 266. The thermocouple 280 is thus normally submerged within the cooking liquid in the region in which the french fries are dropped from the hopper. The thermocouple 280 is connected to an indicating means, such as a digital readout 284 on a control panel 286 at the front of the fryer above the cooked fry discharge region (FIG. 1).

Additionally, the temperature sensor 280, or another similar temperature sensor, can be connected in a control circuit as a part of a control system which increases or decreases the transport speed of the reservoir conveyor 220 as necessary to achieve a predetermined degree of cooking relative to the actual temperature of the cooking liquid 24. The control system can include a conventional solid state heat speed control device 288 located in the control panel 286 and adapted to vary the speed of the motor driving conveyor 220 in order to maintain a constant total heat absorption by the potato pieces as they travel through the cooking liquid.

Typically, at very high capacities, that is, at high product throughput rates, the cooking liquid temperature would decrease and the heat speed control system would then slow the reservoir conveyor 220 so that the potato pieces would remain in the cooking liquid for a longer period of time. At low capacities, that is, at low product throughput rates, the cooking liquid temperature would not decrease as much and hence, the reservoir conveyor 220 would be operated at a higher rate of speed by the heat speed control system. The movement of the foraminous paddles 228 through the cooking liquid 24 causes a certain amount of circulation of the cooking liquid, which circulation tends to promote a uniform temperature throughout the liquid in the reservoir.

At the end of the reservoir 22, the potato pieces, now cooked french fries, are carried upwardly by the conveyor second portion 252 on the upwardly slanting portion 272 of the foraminous screen 266. Cooking liquid is drained off of the french fries during this time and then falls through the screen and back into the reservoir. The french fries are discharged through aperture 182 to a suitable receiving means (not illustrated) where they are collected and from which they may be placed into bags.

As illustrated in FIG. 3, a main power control panel 290 is provided at the loading end of the cooking apparatus 10 for controlling the main electrical power to the apparatus.

The main control panel 290 is also provided with a temperature indicating thermostat 291. The thermostat 291 is connected to a suitable temperature sensor (not illustrated) in the cooking liquid. The thermostat controls the supply of gas to the fryer, such as by opening or closing a conventional two stage, on-off control valve 49, to start and stop the gas flow. The thermostat also actuates the ignition device in the burner when the gas valve 49 is opened so as to provide intermittent combustion capability for maintaining the cooking liquid 24 within a predetermined design range temperature, preferably between 320° F. and 340° F.

The panel 290 is preferably mounted in the apparatus so as to provide cooling channels 292 which conduct cool air in along the bottom of the panel, up along the back of the panel, and out over the top of the panel, as indicated by arrows 294.

The hopper conveyor 120 is driven by a separate motor (not illustrated) and this motor is preferably controlled by a conventional solid state variable speed motor control 296 which is mounted on panel 286 and which is readily adjustable at that location. The throughput rate of the fryer 10 is basically controlled by adjusting the speed of the hopper conveyor 120.

For a given design temperature range of the cooking liquid, it is preferable to leave the reservoir conveyor 220 at an initial set point speed and to control the throughput by varying the speed of the hopper conveyor 120 alone. This ensures that the residence time of the potato pieces in the hot cooking liquid 24 will remain generally constant to provide french fries that are consistently cooked to the same degree. Of course, it is to be realized that with the novel control system of the present invention, the reservoir conveyor 220 is speeded up or slowed down, relative to the initial set point, in response to the actual temperature of the cooking liquid. This provides a "fine tuning" effect to ensure proper cooking of the french fries.

Also, it is possible, by appropriate synchronization of the speeds of both the hopper conveyor 120 and reservoir conveyor 220, to feed the frozen potato pieces into the cooking liquid 24 so that no, or very few, potato pieces impinge upon the paddles 228 of the hopper conveyor. This is desirable because it reduces the possibility of breaking or otherwise damaging the potato pieces. In this regard, it is to be noted that the paddles 228 move relatively rapidly around the sprockets 232 at the loading end of the conveyor. Thus, even in those cases where the hopper conveyor 120 and reservoir conveyor 220 are not synchronized, each paddle 228 can only possibly be an obstacle to the falling potato pieces for the very short time period each paddle moves through the small arc (about 90°) above the liquid 24 at sprockets 232. Hence, most of the potato pieces fall directly into the liquid without hitting the paddles.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

We claim:

1. An apparatus for continuously feeding pieces of potato into hot cooking liquid at a predetermined rate, for frying pieces of potato in the liquid, and for discharging cooked pieces of potato from the liquid automatically, said apparatus comprising:

a frame;

a reservoir mounted on said frame for holding a predetermined amount of cooking liquid;

means for heating said cooking liquid in said reservoir;

hopper means mounted on said frame above said reservoir for holding a supply of said pieces of potato, said hopper means having at least one downwardly slanted bottom wall, said hopper means defining an inlet aperture through which said supply of potato pieces can be loaded into said hopper means and further defining a hopper discharge aperture spaced from said cooking liquid through which said potato pieces are passed;

an endless loop first conveyor means in said hopper means defining a conveying path at an angle relative to said one slanted bottom wall for removing said potato pieces from the bottom of said supply of said potato pieces in said hopper means and for delivering said potato pieces to said hopper discharge aperture for discharge of said pieces through the hopper discharge aperture into said cooking liquid; and second conveyor means in said reservoir for transporting said potato pieces through said hot cooking liquid, said second conveyor means adapted for moving generally equal amounts of potato pieces per unit length of said conveyor means through said cooking liquid and for moving said potato pieces out of said cooking liquid after the pieces have been cooked.

2. The apparatus in accordance with claim 1 in which said hopper means includes a pair of generally vertical opposed sidewalls and first and second sloping bottom walls and in which said endless loop first conveyor means is an endless loop conveyor device mounted in said hopper on horizontal axes, generally perpendicular to said sidewalls; said endless loop conveyor device having a lower end, an upper end, an upwardly sloping forward conveying path facing away from, and parallel to, said second sloping bottom wall, and a return conveying path facing towards, and parallel to, said second sloping bottom wall; said endless loop conveyor device further including transverse flights extending outwardly and closely fitting within the hopper means adjacent said second sloping bottom wall in said return conveying path; said hopper discharge aperture being located in said second sloping bottom wall adjacent said lower end of said endless loop conveyor device whereby pieces of frozen potato are carried by said flights upwardly in said hopper means in said forward conveying path and downwardly along said second sloping bottom wall in said return conveying path to said hopper discharge aperture and are then dropped through said hopper discharge aperture into said cooking liquid.

3. The apparatus in accordance with claim 2 in which said first downwardly sloping bottom wall has an angle with respect to the horizontal of between 20 degrees and 50 degrees and in which said second sloping bottom wall has an angle with respect to the horizontal of between 40 degrees and 70 degrees.

4. The apparatus in accordance with claim 3 in which said first sloping bottom wall has an angle of about 30 degrees with respect to the horizontal and in which said second sloping bottom wall has an angle of about 60 degrees with respect to the horizontal.

5. The apparatus in accordance with claim 1 in which said endless loop first conveyor means includes an endless power driven conveyor having a plurality of partitions defining between them compartments for said potato pieces.

6. The apparatus in accordance with claim 5 in which said partitions are spaced about two inches apart.

7. The apparatus in accordance with claim 1 in which said hopper discharge aperture is located in said hopper relative to said reservoir to provide a free fall distance of about six inches to the surface of said cooking liquid in said reservoir.

8. The apparatus in accordance with claim 1 in which said endless loop first conveyor means has first conveyor control means for adjusting the conveying rate.

9. The apparatus in accordance with claim 1 in which said second conveyor means includes an endless power-driven conveyor having a plurality of partitions that define between them compartments for said pieces of potato.

10. The apparatus in accordance with claim 9 in which said endless power-driven conveyor includes an endless flexible belt mounted in said reservoir on generally horizontal transverse axes.

11. The apparatus in accordance with claim 1 in which said second conveyor means includes a first portion for moving said potato pieces through said cooking liquid and further includes a second portion for moving said potato pieces out of said cooking liquid after the pieces have been cooked.

12. The apparatus in accordance with claim 11 in which said second conveyor means includes an endless flexible belt and outwardly projecting, spaced-apart transverse paddles defining a forward conveying path and a return path, said first portion of said second conveyor means including a first portion of said flexible belt mounted in said reservoir on generally horizontal transverse axes with a forward conveying path located below the level of said cooking liquid and with the return path located above the level of said cooking liquid, said second portion of said second conveyor means including a second portion of said endless flexible belt angled upwardly with respect to said generally horizontal first portion of said flexible belt and extending out of said cooking liquid.

13. The apparatus in accordance with claim 12 further including a foraminous screen spaced below and generally parallel to first and second portions of said belt in said reservoir, said paddles closely fitting said screen in said forward conveying path.

14. The apparatus in accordance with claim 12 in which said flexible belt is a flexible wire link mesh.

15. The apparatus in accordance with claim 12 in which said first portion of said second conveyor means includes a receiving end wherein said flexible belt reverses direction around a generally horizontal axis and wherein said first axis is positioned in said reservoir to provide a generally unobstructed free fall area between said hopper discharge aperture and the surface of the cooking liquid below said hopper discharge aperture.

16. The apparatus in accordance with claim 1 further including cooking liquid temperature sensing means and second conveyor means control means for adjusting the conveying rate of second conveyor means in response to said temperature sensing means.

17. The apparatus in accordance with claim 1 in which said means for heating said cooking liquid includes means for producing combustion flames and at least one elongate burner tube for containing said combustion flames along with incoming air within said reservoir below the surface of the cooking liquid; said burner tube defining an inlet and outlet opening exterior of said reservoir.

18. An apparatus for continuously feeding pieces of potato into hot cooking liquid at a predetermined rate, for frying pieces of potato in the liquid, and for discharging cooked pieces of potato from the liquid automatically, said apparatus comprising:
a frame;
a reservoir mounted on said frame for holding a predetermined amount of cooking liquid;
means for heating said cooking liquid in said reservoir including means for producing combustion flames and at least one elongate burner tube for containing said combustion flames along with incoming air within said reservoir below the surface of the cooking liquid; said burner tube defining an inlet and an outlet opening exterior of said reservoir;
a sealed inlet plenum around at least a portion of said reservoir and communicating with said inlet opening of said burner tube;
hopper means mounted on said frame adjacent said reservoir for holding a supply of said pieces of potato, said hopper means defining an inlet aperture through which said supply of potato pieces can be loaded into said hopper means and further defining a hopper discharge aperture spaced from said cooking liquid through which said potato pieces are passed;
first conveyor means in said hopper means for removing said potato pieces from the bottom of said supply of said potato pieces in said hopper means and for transporting said potato pieces to said hopper discharge aperture and discharging said pieces through the hopper discharge aperture into said cooking liquid; and
second conveyor means in said reservoir for transporting said potato pieces through said hot cooking liquid, said second conveyor means adapted for moving generally equal amounts of potato pieces per unit length of said conveyor means through said cooking liquid and for moving said potato pieces out of said cooking liquid after the pieces have been cooked.

19. The apparatus in accordance with claim 18 further including air intake duct means connected to said plenum for receiving air and directing the incoming air to said plenum.

20. The apparatus in accordance with claim 19 in which said plenum includes a partition means for separating said plenum into a first plenum chamber and a second plenum chamber; said first plenum chamber communicating with said air intake duct means and said second plenum chamber communicating with burner tube inlet opening; said partition means further defining an aperture communicating between said first plenum chamber and said second plenum chamber; said first plenum chamber including a blower means for supplying pressurized air through said partition means aperture to said second plenum chamber.

21. The apparatus in accordance with claim 20 in which said means for supplying and igniting a combustible gas includes conduit means for directing the gas to said burner tube inlet opening and defines at least one orifice through which the pressurized air from said second plenum chamber is admitted to said conduit means for mixing with said combustible gas prior to combustion in said burner tube.

22. The apparatus in accordance with claim 19 further including exhaust duct means for directing the gases from said burner tube outlet opening out of said apparatus, in which said air intake duct means is adjacent said exhaust duct means and in which said air intake duct means and said exhaust duct means are arranged in thermally conductive contact whereby some of the heat from the exhaust gases in said exhaust duct means is transferred to the incoming air in said inlet duct means.

23. The apparatus in accordance with claim 1 further including enclosure means for covering said reservoir, said enclosure means defining an enclosure discharge aperture at one end of said second conveyor means to allow the discharge of cooked pieces of potato and defining an enclosure inlet aperture for allowing the passage of said pieces of potato dropping from said hopper means into said reservoir.

24. An apparatus for continuously feeding pieces of potato into hot cooking liquid at a predetermined rate, for frying pieces of potato in the liquid, and for discharging cooked pieces of potato from the liquid automatically, said apparatus comprising:
a frame;
a reservoir mounted on said frame for holding a predetermined amount of cooking liquid;
means for heating said cooking liquid in said reservoir;
hopper means mounted on said frame adjacent said reservoir for holding a supply of said pieces of potato, said hopper means defining an inlet aperture through which said supply of potato pieces can be loaded into said hopper means and further defining a hopper discharge aperture spaced from said cooking liquid through which said potato pieces are passed;
first conveyor means in said hopper means for removing said potato pieces from the bottom of said supply of said potato pieces in said hopper means for transporting said potato pieces to said hopper discharge aperture and discharging said pieces through the hopper discharge aperture into said cooking liquid;
second conveyor medans in said reservoir for transporting said potato pieces through said hot cooking liquid, said second conveyor means adapted for moving generally equal amounts of potato pieces per unit length of said conveyor means through said cooking liquid and for moving said potato pieces out of said cooking liquid after the pieces have been cooked;
enclosure means for covering said reservoir, said enclosure means defining an enclosure discharge aperture at one end of said second conveyor means to allow the discharge of cooked pieces of potato and defining an enclosure inlet aperture for allowing the passage of said pieces of potato dropping from said hopper means into said reservoir; and
water vapor extraction duct means communicating with said reservoir via said enclosure inlet aperture for receiving the water vapor generated upon contact of frozen pieces of potato with the hot cooking liquid.

25. The apparatus in accordance with claim 24 further including a blower means mounted within said extraction duct means for reducing the pressure within said reservoir in the region below said hopper discharge aperture for effecting a positive withdrawal of said water vapor from said reservoir.

26. The apparatus in accordance with claim 25 in which said means for heating said cooking liquid includes a gas heater having a combustion gas exhaust duct and in which said water vapor extraction duct means is connected with said exhaust gas duct means.

27. An apparatus for continuously feeding pieces of food into hot liquid at a predetermined rate, for frying the food pieces in the liquid, and for discharging cooked food pieces from the liquid automatically, said apparatus comprising:
a frame;
hopper means mounted on said frame for holding a supply of said food pieces, said hopper means defining an inlet aperture through which said supply of food pieces can be loaded into said hopper means, and said hopper means having at least one downwardly slanted bottom wall and further defining a hopper discharge aperture through which said food pieces are passed;
an endless loop first conveyor means in said hopper means defining a conveying path at an angle relative to said one slanted bottom wall for lifting said food pieces from the bottom of said supply of said food pieces to the top of said supply and dropping said food pieces through said hopper discharge aperture at a generally predetermined rate;
a reservoir on said frame below said hopper means for holding said cooking liquid spaced from and below said hopper discharge aperture for receiving said dropping food pieces;
means for heating said cooking liquid in said reservoir; and
second conveyor means for collecting said food pieces dropped into said cooking liquid and for transporting said food pieces through said cooking liquid, said conveyor means having a first portion adapted for moving generally equal amounts of food pieces per unit length of said conveyor means through said cooking liquid and having a second portion for moving said food pieces out of said cooking liquid after the pieces have been cooked.

28. The apparatus in accordance with claim 27 in which said endless loop first conveyor means includes projecting flights and means for moving said flights in an endless loop.

29. The apparatus in accordance with claim 28 in which said endless loop first conveyor means further includes a stationary support surface in the form of a continuous loop defining a forward conveying path and a return conveying path.

30. The apparatus in accordance with claim 27 in which said endless loop first conveyor means includes a plurality of transverse flights mounted for movement along a forward conveying path and along a return conveying path parallel to said forward conveying path.

31. An apparatus for continuously feeding pieces of frozen potato into hot cooking liquid at a predetermined rate, for frying pieces of potato within the liquid, and for discharging cooked pieces of potato from the liquid automatically, said apparatus comprising:

a frame;

a generally enclosed elongate reservoir mounted on said frame for holding a predetermined amount of cooking liquid, said reservoir including an inlet passageway at one end above said cooking liquid and a reservoir discharge aperture at the other end above said cooking liquid;

a plurality of generally horizontally disposed combustion gas burner tubes mounted with said reservoir from one end of the reservoir to the other end and adapted to be submerged by said cooking liquid, said burner tubes defining inlet openings exterior of the reservoir on one end of said reservoir and defining outlet openings exterior of the reservoir on the other end of said reservoir, said reservoir being sealed around said burner tubes inwardly of said burner tube inlet and outlet openings;

combustion gas supply means communicating with said burner tube inlet openings;

intake air inlet duct means communicating between said burner tube inlet openings and the ambient atmosphere exterior of said apparatus;

exhaust duct means communicating between said burner tube outlet openings and the ambient atmosphere exterior of said apparatus, said exhaust duct means arranged in thermally conductive contact with said intake air inlet duct means for exchanging heat from the hot exhaust gases to the cooler inlet air in said inlet duct means;

hopper means mounted on said frame above said reservoir for holding a supply of said pieces of frozen potato, said hopper means defining a hopper inlet through which said supply of potato pieces can be loaded into said hopper means and further defining a hopper discharge aperture through which said potato pieces are passed, said hopper discharge aperture spaced above said cooking liquid at one end of said reservoir and in alignment with said reservoir inlet passageway;

first conveyor means in said hopper means for lifting potato pieces from the bottom of said supply of said potato pieces in said hopper means and for transporting said pieces of potato through said hopper discharge aperture and through said reservoir inlet passageway into said cooking liquid;

vapor extraction duct means communicating between said exhaust duct means and said reservoir inlet passageway for removing the water vapor generated upon contact of frozen potato pieces with the hot cooking liquid;

a foraminous screen in said reservoir above said burner tubes, said foraminous screen having a first arcuate portion and a second straight, generally horizontal portion merging with said arcuate portion and a third upwardly sloping portion merging with said second portion and extending to said reservoir discharge aperture; and second conveyor means in said reservoir for transporting said potato pieces through said cooking liquid, said second conveyor means including an endless conveyor device mounted in said reservoir on horizontal transverse axes, one of said axes defining a loading end of the conveyor device located in said reservoir to provide a generally unobstructed free fall area below said reservoir inlet passageway for receiving said dropping potato pieces, said endless conveyor device including a generally flexible belt and transverse, foraminous paddles extending outwardly from said flexible belt defining a forward conveying path below the belt and a return path above the belt, said endless conveyor device defining longitudinally aligned first and second portions, said first portion arranged with said flexible belt disposed generally horizontally and submerged within said cooking liquid in the forward conveying path and above said cooking liquid said return path, said second portion angled upwardly with respect to said first portion and extending out of said cooking liquid to said reservoir discharge aperture, said paddles in said forward conveying path closely fitting within portions of the reservoir and with said foraminous screen whereby generally equal amounts of potato pieces per pair of adjacent paddles are carried by said paddles through said cooking liquid and are discharged from said apparatus out of said reservoir discharge aperture after the pieces have been cooked.

32. The apparatus in accordance with claim 31 including cooking liquid temperature sensing means and control means for adjusting the conveying rate of said second conveyor means in response to said temperature sensing means.

33. The apparatus in accordance with claim 32 including control means for adjusting the conveying rate of said first conveyor means.

34. The apparatus of claim 33 in which said first portion of said second conveyor means maintains said potato pieces submerged below the surface of said cooking liquid.

* * * * *